United States Patent
Toutsuka et al.

(10) Patent No.: US 6,899,768 B2
(45) Date of Patent: May 31, 2005

(54) MAGNESIUM OXIDE PARTICLE AGGREGATE

(75) Inventors: Atsuo Toutsuka, Ako (JP); Yutaka Hiratsu, Ako (JP)

(73) Assignee: Tateho Chemical Industries Co., Ltd. (JP)

( * ) Notice: Subject to any disclaimer, the term of this patent is extended or adjusted under 35 U.S.C. 154(b) by 32 days.

(21) Appl. No.: 10/415,168

(22) PCT Filed: Oct. 25, 2001

(86) PCT No.: PCT/JP01/09354

§ 371 (c)(1),
(2), (4) Date: Apr. 24, 2003

(87) PCT Pub. No.: WO02/34965

PCT Pub. Date: May 2, 2002

(65) Prior Publication Data

US 2004/0040627 A1 Mar. 4, 2004

(30) Foreign Application Priority Data

Oct. 25, 2000 (JP) ........................................ 2000-325274

(51) Int. Cl.$^7$ .............................................. B23K 35/24
(52) U.S. Cl. ........................ 148/27; 148/113; 423/583; 423/635; 501/108; 502/34

(58) Field of Search ................... 148/27, 113; 423/583, 423/635; 501/108; 502/340

(56) References Cited

U.S. PATENT DOCUMENTS 3,930,906 A * 1/1976 Irie et al. ..................... 148/308

FOREIGN PATENT DOCUMENTS

| JP | 03115585 | 5/1991 |
| JP | 10046259 | 2/1998 |
| JP | 11181525 | 7/1999 |

* cited by examiner

Primary Examiner—John P. Sheehan
(74) Attorney, Agent, or Firm—Muserlian, Lucas and Mercanti (57) ABSTRACT

The present invention is related to a magnesium oxide particle aggregate with the requirement of a first inflection point diameter is more than $0.30 \times 10^{-6}$ to $0.60 \times 10^{-6}$ m, a particle void volume is $0.50 \times 10^{-3}$ to $0.90 \times 10^{-3}$ m$^3$·kg$^{-1}$, and a micropore volume is $0.04 \times 10^{-3}$ to $0.11 \times 10^{-3}$ m$^3$·kg$^{-1}$ in the cumulative intrusion volume curve of said particle by having controlled particle aggregation structure so that the solid phase-solid phase reaction between magnesium oxide and the SiO$_2$ film on the surface can be appropriately controlled.

2 Claims, 6 Drawing Sheets

MAGNESIUM OXIDE PARTICLE AGGREGATE

This application is a 371 of PCT/JP01/09354 filed Oct. 25, 2001.

FIELD OF THE INVENTION

The present invention relates to a magnesium oxide particle aggregate having a controlled particle aggregation structure. More particularly, the present invention relates to a magnesium oxide particle aggregate used as an annealing separator to form a forsterite film which imparts excellent insulation properties and magnetic properties to a grain-oriented magnetic steel sheet.

BACKGROUND ART

Grain-oriented magnetic steel sheets used in transformers or generators are generally produced by a process in which silicon steel containing about 3% of Si is hot-rolled, subsequently cold-rolled so as to have a final sheet thickness, and then subjected to decarburization annealing (primary recrystallization annealing), followed by finishing annealing. In this process, for imparting insulation properties to a magnetic steel sheet, after the decarburization annealing and before the final finishing annealing, a slurry containing magnesium oxide is applied to a surface of the steel sheet and then dried, and wound into a coil form. Si contained in the silicon steel sheet reacts with oxygen during the decarburization annealing to form an $SiO_2$ film on the surface of the steel sheet. $SiO_2$ in the film then reacts with magnesium oxide in the slurry during the finishing annealing to form a forsterite ($Mg_2SiO_4$) film having excellent insulation properties on the surface of the steel sheet. The forsterite film is considered to impart not only insulation properties but also a tension to the surface thereof due to the difference in the coefficient of thermal expansion between the forsterite film and the steel sheet, thus lowering core loss of the grain-oriented magnetic steel sheet to improve the magnetic properties.

Therefore, the forsterite film plays an extremely important role in the production of grain-oriented magnetic steel sheets, and hence the properties of magnesium oxide forming the forsterite film directly affect the magnetic properties thereof. For this reason, a number of inventions have been made with respect to the magnesium oxide used as an annealing separator, especially having a controlled citric acid activity (CAA) between magnesium oxide particles and citric acid, and, for example, Japanese Prov. Patent Publication Nos. 58331/1980, 33138/1994, and 158558/1999 have been disclosed.

However, CAA merely simulates empirically the reactivity in the solid phase-solid phase reaction between $SiO_2$ and magnesium oxide whose reaction actually proceeds on the surface of the magnetic steel sheet, based on the solid phase-liquid phase reaction between magnesium oxide and citric acid. Further, magnesium oxide is often present in the form of particle aggregate in which several powder particles bind together and agglomerate, and therefore CAA cannot appropriately evaluate the forsterite formation reaction.

On the other hand, Japanese Prov. Patent Publication No. 46259/1998 discloses an invention made in respect of the fact that the film quality varies depending on the state of the pores in magnesium oxide. In this invention, the pore volume is restricted using a constant-capacity gas adsorption method, however, in the gas adsorption method, it determines the amount of gas molecules which adsorb onto the pore surfaces present on the particle surfaces. Therefore, only pores as very small as, for example, $0.1 \times 10^{-6}$ m or less can be measured and thus, it is considered that this method is difficult to apply to the particle aggregation structure having a size of about $1 \times 10^{-5}$ to $1 \times 10^{-6}$ m observed in the actual magnesium oxide particle aggregates, and hence cannot appropriately evaluate the forsterite formation reaction.

In view of this, the present inventors have found indices which can appropriately evaluate the forsterite formation reactivity of a magnesium oxide particle aggregate, and have completed an invention of a magnesium oxide particle aggregate having a particle aggregation structure specified using the indices (Japanese Patent Application No. 2000-132370). Namely, in the cumulative intrusion volume curve of the magnesium oxide particle aggregate, if these are controlled in a range where a first inflection point diameter is $0.30 \times 10^{-6}$ m or less, an interparticle void volume is $1.40 \times 10^{-3}$ to $2.20 \times 10^{-3}$ $m^3 \cdot kg^{-1}$, and a particle void volume is $0.55 \times 10^{-3}$ to $0.80 \times 10^{-3}$ $m^3 \cdot kg^{-1}$, it is possible to form forsterite at a satisfactory rate on the surface of an magnetic steel sheet.

However, the present inventors have found that, with respect to the range considered to be unsuitable for the forsterite formation in the above earlier patent application filed by the present inventors, for example, a range in which the first inflection point diameter exceeds $0.30 \times 10^{-6}$ m, there is a possibility that excellent forsterite formation is achieved by further strictly controlling the particle aggregation structure of the magnesium oxide particle aggregate.

An object of the present invention is to provide a magnesium oxide particle aggregate having a particle aggregation structure further controlled so that the forsterite formation rate can be appropriately controlled.

In addition, another object of the present invention is to provide an annealing separator for grain-oriented magnetic steel sheet, using the magnesium oxide particle aggregate of the present invention, and to provide a grain-oriented magnetic steel sheet obtainable by a treatment using the annealing separator for grain-oriented magnetic steel sheet of the present invention.

DISCLOSURE OF THE INVENTION

Namely, the present invention is a magnesium oxide particle aggregate characterized in that a first inflection point diameter is more than $0.30 \times 10^{-6}$ to $0.60 \times 10^{-6}$ m, a particle void volume is $0.50 \times 10^{-3}$ to $0.90 \times 10^{-3}$ $m^3 \cdot kg^{-1}$, and a micropore volume is $0.04 \times 10^{-3}$ to $0.11 \times 10^{-3}$ $m^3 \cdot kg^{-1}$ in the cumulative intrusion volume curve of the particle.

In addition, the present invention is a magnesium oxide particle aggregate characterized in that an interparticle void volume in the cumulative intrusion volume curve of the particle is $0.80 \times 10^{-3}$ to less than $1.40 \times 10^{-3}$ $m^3 \cdot kg^{-1}$, a particle void volume is $0.50 \times 10^{-3}$ to $0.90 \times 10^{-3}$ $m^3 \cdot kg^{-1}$, and a micropore volume is $0.04 \times 10^{-3}$ to $0.11 \times 10^{-3}$ $m^3 \cdot kg^{-1}$ in the cumulative intrusion volume curve of the particle.

BEST MODE FOR CARRYING OUT THE INVENTION

Figure 1:
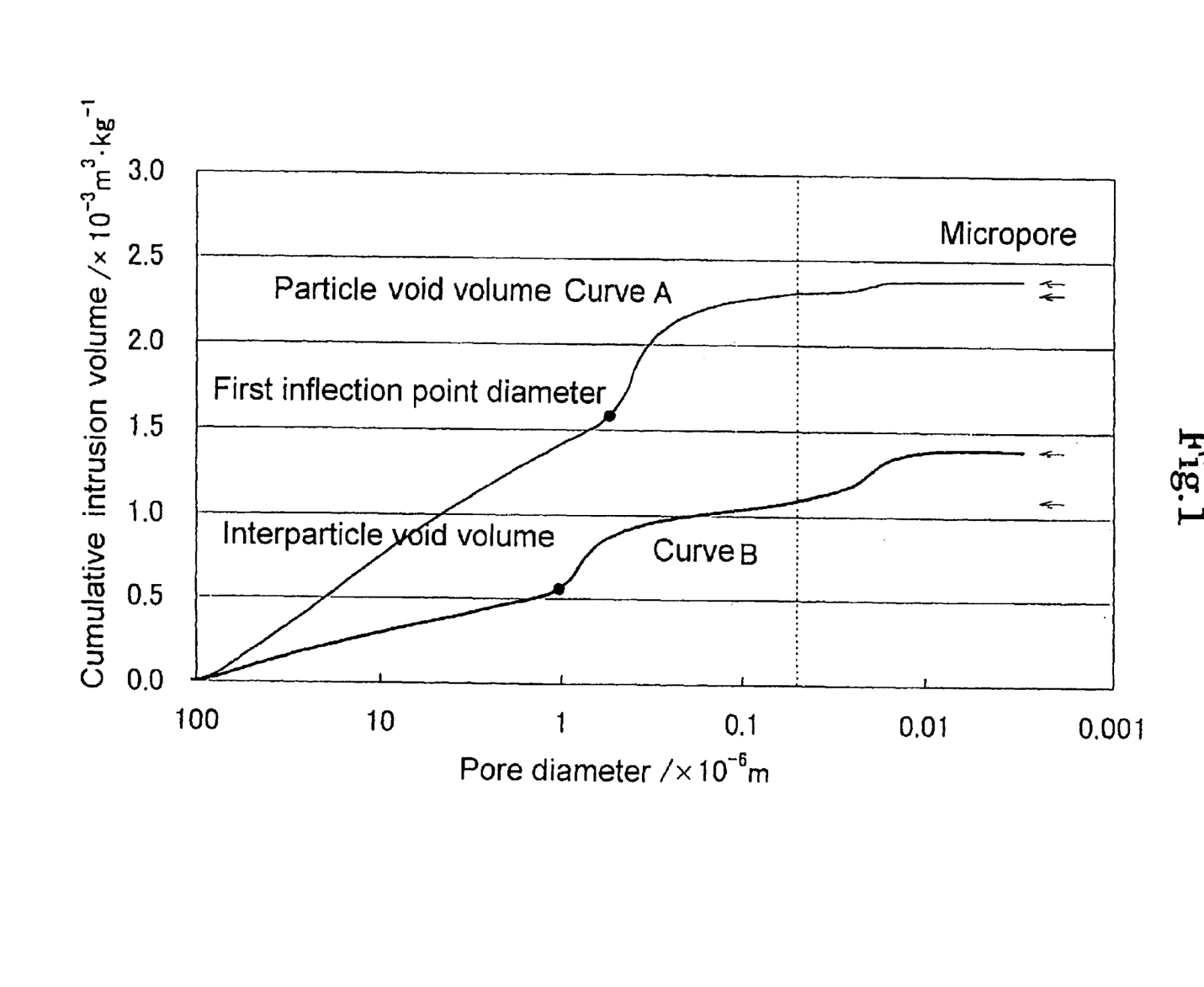
FIG. 1 shows examples of cumulative intrusion volume curves of particle aggregates comprised mainly of magnesium oxide, determined from a pore distribution measurement by mercury porosimetry.

In the present invention, a cumulative intrusion volume curve of particles refers to a curve which shows a relationship between a pore diameter and a cumulative pore volume determined from a pore distribution measurement by mercury porosimetry, and FIG. 1 shows examples of cumulative intrusion volume curves of two types of magnesium oxide particle aggregates having different particle aggregation structures. The first inflection point is the inflection point at the largest pore diameter among inflection points at which the cumulative intrusion volume curve suddenly rises, and it is indicated by a solid circle in the figure. The first inflection point diameter refers to a pore diameter at the first inflection point. The interparticle void volume refers to a cumulative pore volume at the first inflection point. The particle void volume is represented by a volume value obtained by subtracting the cumulative pore volume at the first inflection point from the total pore volume represented by the cumulative pore volume at a pore diameter of $0.003 \times 10^{-6}$ m. The micropore volume refers to a cumulative pore volume of micropores smaller than $0.05 \times 10^{-6}$ m, and is represented by a volume value obtained by subtracting the cumulative pore volume at $0.05 \times 10^{-6}$ m from the total pore volume and falls in the region indicated by arrows near the right-hand ordinate in FIG. 1.

The present inventors have made studies on a solid phase-solid phase reaction between magnesium oxide and $SiO_2$, which reaction proceeds on a surface of a grain-oriented magnetic steel sheet, and, as a result, they have found that the first inflection point diameter in the cumulative intrusion volume curve as determined from a pore distribution measurement by mercury porosimetry, a particle void volume, and a interparticle void volume as well as a micropore volume can be used as indices for properly indicating the structure of a magnesium oxide particle aggregate. Based on the above finding, these indices are controlled so as to fall in respective appropriate ranges to create a magnesium oxide particle aggregate which can appropriately control a forsterite formation on a surface of a grain-oriented magnetic steel sheet.

The pore distribution measurement by mercury porosimetry for obtaining indices indicating a particle aggregation structure was conducted by the following method. In the measurements of pore distribution of porous solid materials, the method of mercury porosimetry is well known as an analysis method for obtaining pore distribution data of powder and data about a particle aggregation structure.

As a mercury porosimeter, AutoPore 9410, manufactured by Micromeritics GbmH, is used. Measurement cell for powdery sample having a cell capacity of $5 \times 10^{-6}$ m$^3$ and a stem capacity of $0.38 \times 10^{-6}$ m$^3$ is used. A sample to be measured is preliminarily treated using a 330 mesh standard sieve (JIS-R8801-87) so as to have substantially uniform particle diameters and then precisely weighed in the mass range of from $0.10 \times 10^{-3}$ to $0.13 \times 10^{-3}$ kg, and placed in the measurement cell. The measurement cell is set in the porosimeter, and then the inside of the cell is maintained in a reduced pressure state at 50 $\mu$Hg (6.67 Pa) or less for 20 minutes. Next, mercury is charged into the measurement cell until the pressure in the cell becomes 1.5 psia (10,342 Pa). Then, the mercury is pressed under a pressure in the range of from 2 psia (13,790 Pa) to 60,000 psia (413.7 MPa) to measure pore distribution. As the mercury for the measurement, a special grade mercury reagent having a purity of 99.5 mass % or higher is used, and the density of the mercury used is $13.5335 \times 10^3$ kg·m$^{-3}$.

The mercury pressing pressure is converted to a pore diameter using the following formula (I)(Washburn's equation).

$$D = -(1/P) \cdot 4\gamma \cdot \cos \phi \qquad (I)$$

wherein D: pore diameter (m);
P: mercury pressing pressure (Pa);
$\gamma$: surface tension of mercury {485 dyne·cm$^{-1}$ (0.485 Pa·m)}; and
$\phi$: contact angle of mercury (130°=2.26893 rad).

When pressing mercury into a particle aggregate, mercury first penetrates into the voids between the particles. In this instance, as the mercury pressing pressure increases, that is, the pore diameter determined from the mercury pressing pressure decreases, the cumulative pore volume increases with a substantially constant gradient. After all voids between the particles are filled with mercury, mercury starts penetrating into the voids in the particles. A great number of voids having substantially the same size are present in the particles, and the sum of the voids in the particles (the sum of the pore volumes) is large. Therefore, when the penetration of mercury is changed from through the voids between the particles to through the voids in the particles, the cumulative pore volume drastically increases even as the mercury pressing pressure slightly increases. This can be seen in the cumulative intrusion volume curves of FIG. 1.

A first inflection point diameter, a particle void volume, an interparticle void volume, and a micropore volume are individually determined from the cumulative intrusion volume curve as follows.

In the cumulative intrusion volume curves of FIG. 1, the cumulative pore volume on the ordinate indicates a cumulative value of the pore volume in the particle aggregate per unit mass of the sample determined from larger pore diameters successively. The inflection point is a point at which a cumulative intrusion volume curve suddenly rises. The number of inflection point is not necessarily one, and, depending on the sample to be measured, as can be seen in curve B in FIG. 1, there is the case where a plurality of inflection points are present, but the inflection point at the largest pore diameter is taken as the first inflection point. The first inflection point diameter is the pore diameter at the first inflection point. The interparticle void volume is a void volume between the aggregate particles, and it is represented by the cumulative pore volume at the first inflection point. The particle void volume is a void volume which is present in the particles and smaller than the diameter of the aggregate particles, and it is represented by a volume value obtained by subtracting the cumulative pore volume at the first inflection point from the total pore volume. The micropore volume is represented by a volume value obtained by subtracting the cumulative pore volume at a pore diameter of $0.05 \times 10^{-6}$ m from the total pore volume. The total pore volume is a cumulative pore volume at a pore diameter of $0.003 \times 10^{-6}$ m. This is because the particle structure is changed due to the mercury pressing pressure in the pore distribution measurement by mercury porosimetry, and therefore, the measurement error can be lowered by using the cumulative pore volume at the maximum mercury pressing pressure as a total pore volume.

Next, magnesium oxide particle aggregates having different particle aggregation structures, in which a first inflection point diameter, a particle void volume, a interparticle void volume, and a micropore volume in a cumulative intrusion volume curve are individually different, were prepared to examine the reaction rates of the solid phase reactions between the individual magnesium oxide particle aggregates and $SiO_2$. The results are shown in Table 1.

TABLE 1

| Unit | First inflection point diameter $*10^{-6}$ m | Particle void volume $*10^{-3}$ $m^3 \cdot kg^{-1}$ | Interparticle void volume $*10^{-3}$ $m^3 \cdot kg^{-1}$ | Micropore volume $*10^{-3}$ $m^3 \cdot kg^{-1}$ | Forsterite formation rate % |
|---|---|---|---|---|---|
| A | 0.17 | 0.77 | 2.16 | 0.04 | 91.3 |
| B | 0.18 | 0.88 | 1.31 | 0.02 | 86.2 |
| C | 0.17 | 0.83 | 2.44 | 0.08 | 84.7 |
| D | 0.23 | 0.65 | 1.68 | 0.05 | 91.9 |
| E | 0.23 | 0.66 | 1.35 | 0.03 | 89.7 |
| F | 0.24 | 0.65 | 2.33 | 0.01 | 86.5 |
| G | 0.21 | 0.85 | 1.81 | 0.03 | 89.5 |
| H | 0.22 | 0.58 | 1.43 | 0.01 | 90.5 |
| I | 0.25 | 0.56 | 2.12 | 0.01 | 90.1 |
| J | 0.22 | 0.52 | 1.59 | 0.01 | 86.8 |
| K | 0.27 | 0.74 | 1.46 | 0.05 | 91.8 |
| L | 0.26 | 0.49 | 1.31 | 0.02 | 81.2 |
| M | 0.27 | 0.53 | 2.27 | 0.05 | 82.1 |
| N | 0.45 | 0.71 | 1.51 | 0.03 | 87.2 |
| O | 0.43 | 0.72 | 1.28 | 0.01 | 84.9 |
| P | 0.44 | 0.72 | 2.29 | 0.02 | 83.6 |
| Q | 0.43 | 0.91 | 1.62 | 0.02 | 81.0 |
| R | 0.42 | 0.48 | 1.45 | 0.01 | 78.8 |
| S | 0.59 | 0.52 | 2.25 | 0.01 | 77.0 |
| T | 0.61 | 0.48 | 1.34 | 0 | 75.5 |
| U | 0.88 | 0.84 | 1.27 | 0 | 77.7 |
| V | 0.90 | 0.85 | 2.32 | 0.03 | 75.6 |
| a | 0.38 | 0.61 | 0.85 | 0.08 | 92.5 |
| b | 0.55 | 0.82 | 1.29 | 0.10 | 91.9 |
| c | 0.42 | 0.72 | 1.88 | 0.05 | 90.7 |
| d | 0.28 | 0.66 | 0.89 | 0.05 | 90.6 |
| e | 0.67 | 0.58 | 1.45 | 0.06 | 87.6 |
| f | 0.95 | 0.77 | 1.89 | 0.10 | 79.3 |
| g | 0.41 | 0.54 | 1.24 | 0.02 | 85.6 |
| h | 0.35 | 0.72 | 1.42 | 0.13 | 87.3 |
| i | 0.45 | 0.45 | 1.37 | 0.07 | 85.4 |
| j | 0.39 | 0.94 | 1.28 | 0.09 | 86.1 |
| k | 0.24 | 0.62 | 0.75 | 0.01 | 82.3 |
| l | 0.45 | 0.71 | 2.33 | 0.03 | 84.6 |
| m | 0.54 | 0.82 | 0.87 | 0.18 | 83.1 |

In the solid phase-solid phase reaction between magnesium oxide and $SiO_2$, these were directly reacted with each other to form forsterite. Namely, each magnesium oxide particle aggregate having an individual particle aggregation structure and amorphous $SiO_2$ were mixed in a molar ratio of 2:1 to form a mixture, and it was press-molded under a pressure of 50 MPa into pellets having a diameter of $15 \times 10^{-3}$ m and a height of $15 \times 10^{-3}$ m. Then, the molded articles were calcined in a nitrogen gas atmosphere at 1,200° C. for 4 hours. With respect to the thus obtained sintered product, an X-ray diffraction analysis was conducted to quantitatively determine a forsterite formation rate in the sintered product.

Figure 2:
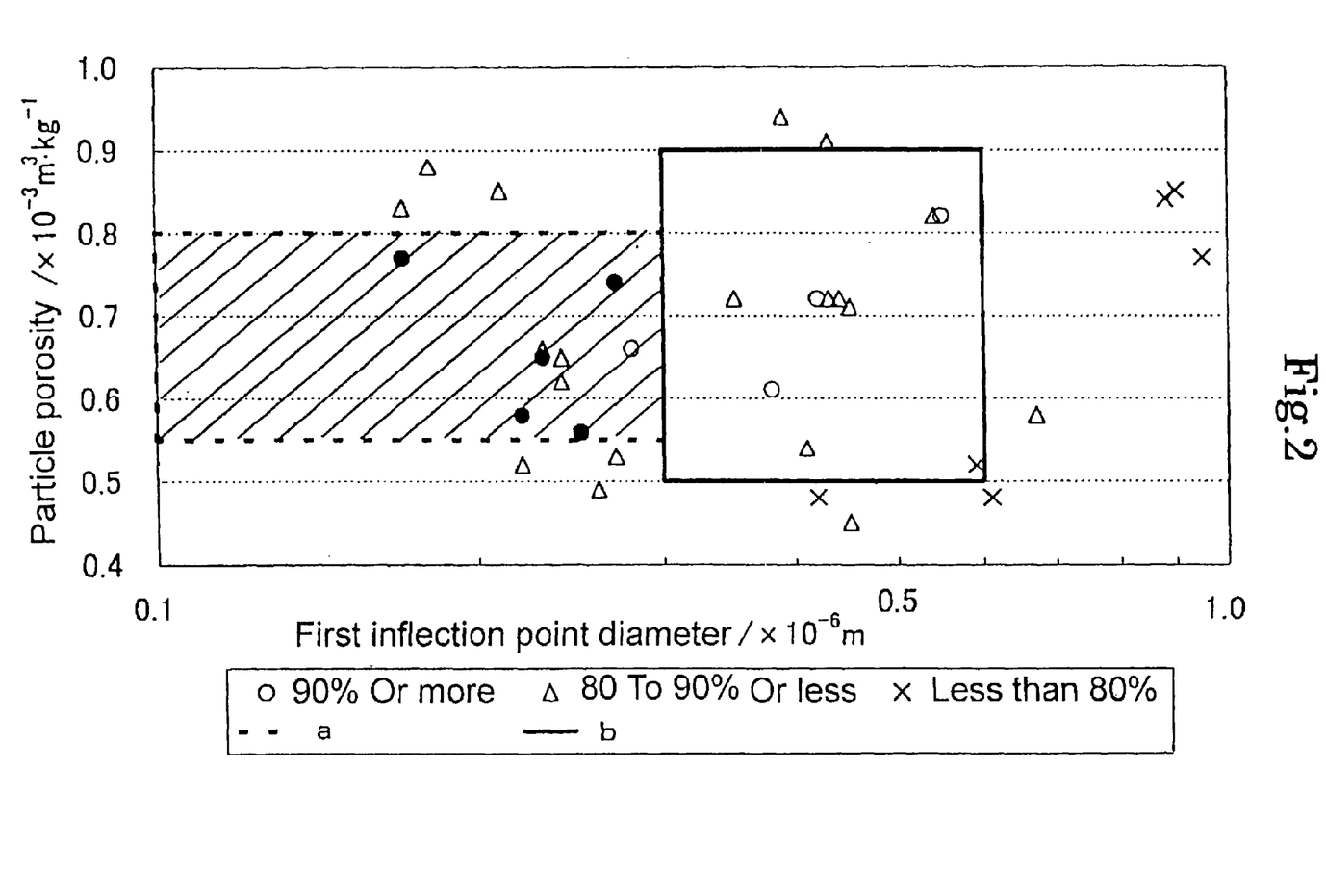
FIG. 2 shows a relationship between a forsterite formation rate, a first inflection point diameter, and a particle void volume with respect to various magnesium oxide particle aggregates.
Figure 3:
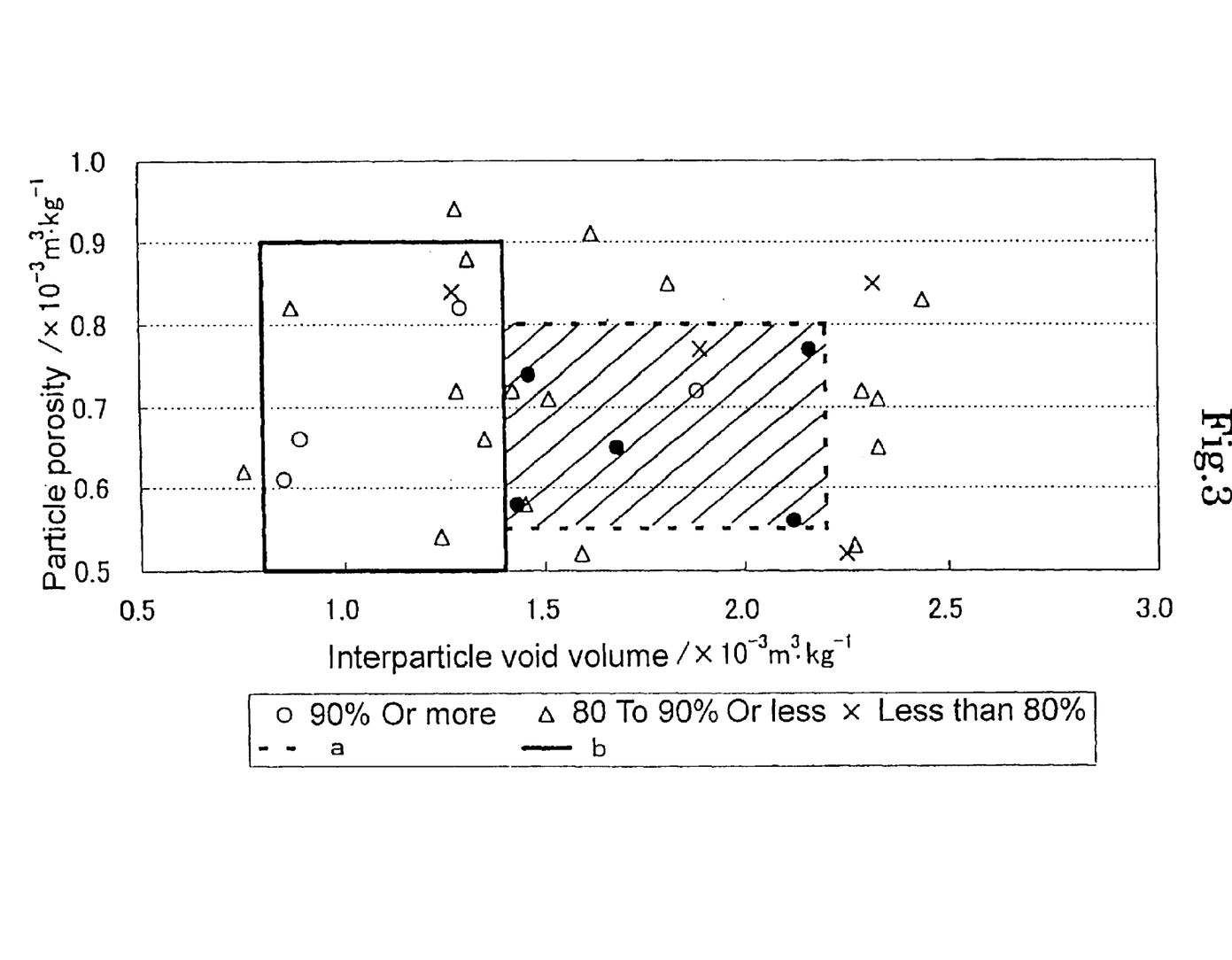
FIG. 3 shows a relationship between a forsterite formation rate, an interparticle void volume, and a particle void volume with respect to various magnesium oxide particle aggregates.

With respect to the thus measured samples, a relationships between a forsterite formation rate, a first inflection point diameter, a particle void volume, a interparticle void volume, and a micropore volume in a cumulative intrusion volume curve are shown in FIGS. 2 to 5. In FIGS. 2 and 3, forsterite formation rate values are indicated by classifying into three levels, i.e., 90% or more, more than 80 to less than 90%, and less than 80%. In the figures, area a sectioned by a dotted line corresponds to the range defined in the above-mentioned earlier patent application filed by the present inventors, and area b sectioned by a solid line corresponds to the range defined in the present invention.

Figure 4:
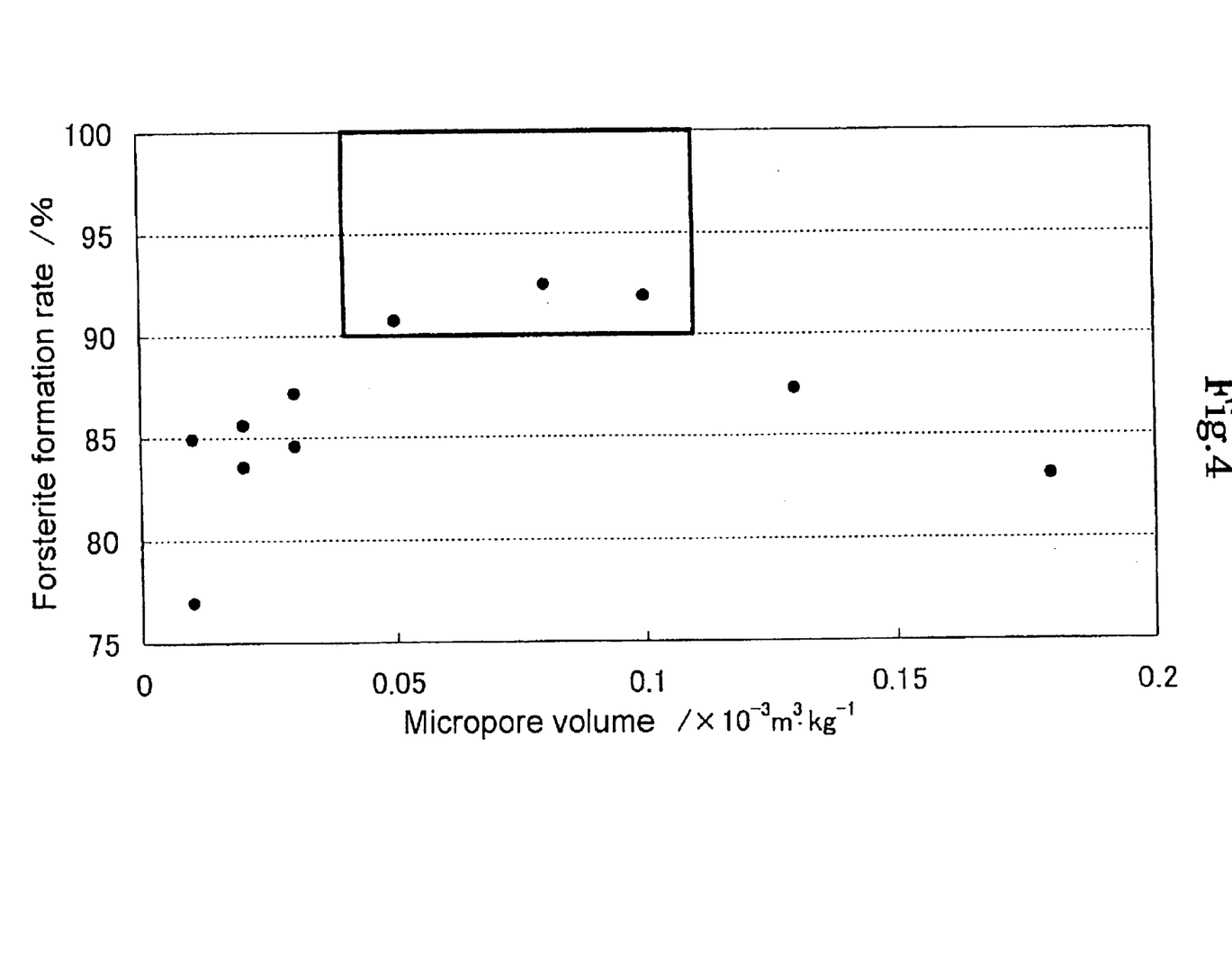
FIG. 4 shows a relationship between a micropore volume and a forsterite formation rate with respect to the particle aggregate having a first inflection point diameter of more than $0.30 \times 10^{-6}$ to $0.60 \times 10^{-6}$ m and a particle void volume of $0.50 \times 10^{-3}$ to $0.90 \times 10^{-3}$ m$^3 \cdot$kg$^{-1}$.
Figure 5:
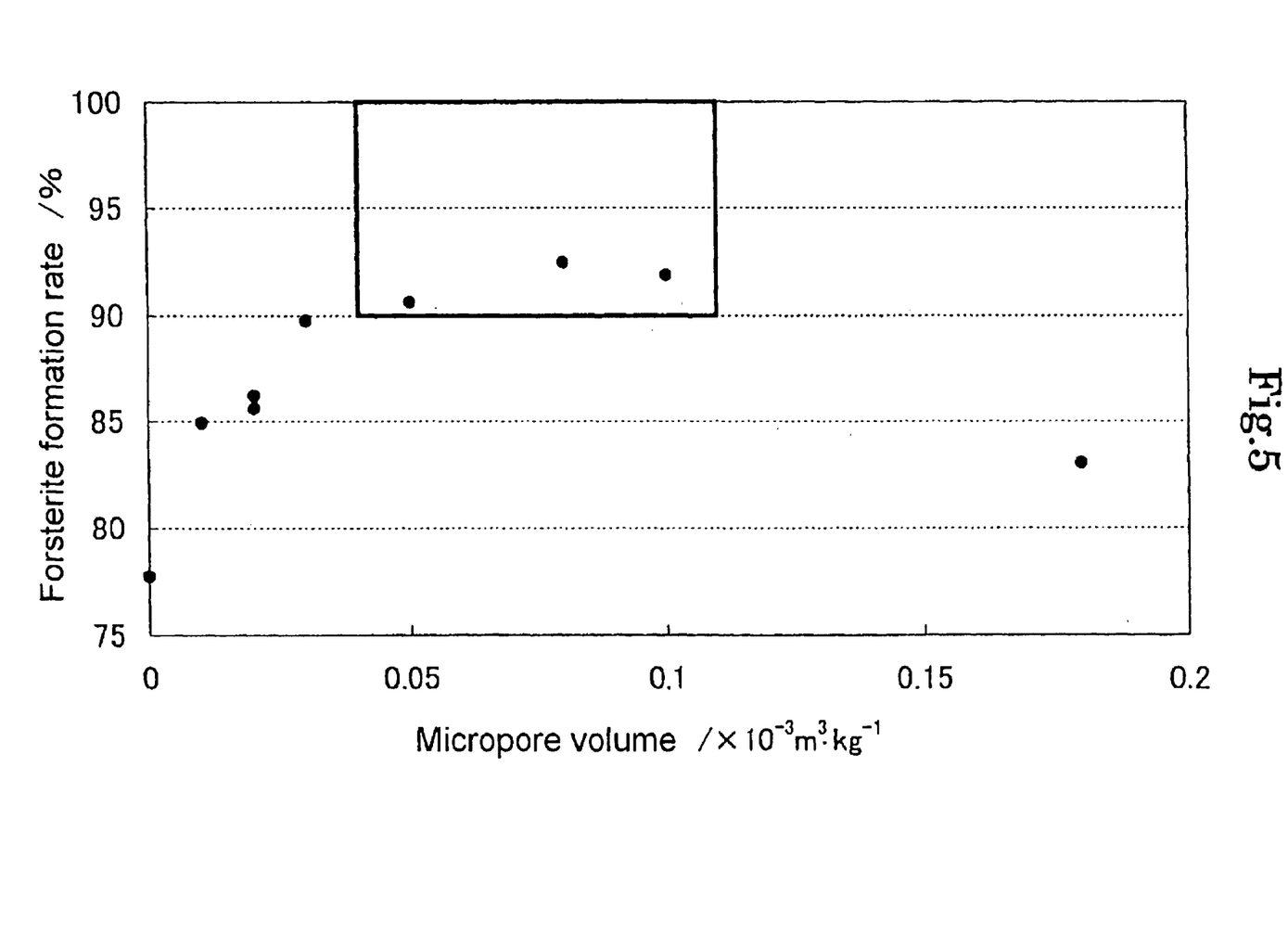
FIG. 5 shows a relationship between a micropore volume and a forsterite formation rate with respect to a particle aggregate having an interparticle void volume of $0.80 \times 10^{-3}$ to less than $1.40 \times 10^{-3}$ m$^3 \cdot$kg$^{-1}$ and a particle void volume of $0.50 \times 10^{-3}$ to $0.90 \times 10^{-3}$ m$^3 \cdot$kg$^{-1}$.

The first inflection point diameter indicates the size of the largest particle structure in the aggregate particles, and, the smaller the first inflection point diameter, the larger the number of contact points between the magnesium oxide particles and $SiO_2$, or the higher the activity. Therefore, the first inflection point diameter is preferably $0.30 \times 10^{-6}$ m or less, which corresponds to the range in the earlier patent application filed by the present inventors, and, when the first inflection point diameter exceeds $0.30 \times 10^{-6}$ m, the number of contact points between the magnesium oxide particles and $SiO_2$ generally lacks, making it difficult to form forsterite at a satisfactory rate. However, as can be seen in FIG. 2, there is a specific region such that forsterite can be formed at a rate of 90% or higher at a first inflection point diameter of $0.60 \times 10^{-6}$ m or less even when the first inflection point diameter exceeds $0.30 \times 10^{-6}$ m. This region corresponds to the case where the particle void volume falls in the range of $0.50 \times 10^{-3}$ to $0.90 \times 10^{-3}$ $m^3 \cdot kg^{-1}$ (FIG. 2) and the micropore volume falls in the range of $0.04 \times 10^{-3}$ to $0.11 \times 10^{-3}$ $m^3 \cdot kg^{-1}$ (FIG. 4). The reason for this is presumed that the highly active magnesium oxide particle surfaces which are partially present on the particles make up for the lack of the contact points in this region. With respect to the forsterite formation, a value of 90% or more was taken as a satisfactory value for the forsterite formation rate. When the forsterite formation rate can satisfy such a reference value, a forsterite film having excellent adhesion to the surface of a magnetic steel sheet can be formed.

On the other hand, the interparticle void volume is an index which indirectly indicates the form of the aggregate particles, and, when the interparticle void volume falls in an appropriate range, the contact points between the magnesium oxide particles and $SiO_2$ can be appropriately controlled. Therefore, when the interparticle void volume is less than $1.40 \times 10^{-3}$ $m^3 \cdot kg^{-1}$, which corresponds to the range in the earlier patent application filed by the present inventors, the number of contact points between the magnesium oxide particles and $SiO_2$ generally lacks, making it difficult to form forsterite at a satisfactory rate. However, as can be seen in FIG. 3, there is a region such that forsterite can be formed at a rate of 90% or higher at an interparticle void volume of $0.80 \times 10^{-3}$ $m^3 \cdot kg^{1}$ or more even when the interparticle void volume is less than $1.40 \times 10^{-3}$ $m^3 \cdot kg^{-1}$. This region corresponds to the case where both the particle void volume and the micropore volume fall in the above respective ranges shown in FIGS. 3 and 5.

In other words, even when the magnesium oxide particle aggregate has a first inflection point diameter and an interparticle void volume falling in the respective ranges which are not suitable for the forsterite formation in the earlier patent application filed by the present inventors, forsterite is stably formed at a rate of 90% or higher as long as both the particle void volume and the micropore volume fall in the respective appropriate ranges.

Namely, the particle void volume is an index indicating the density of the aggregate particle. When the particle void volume is less than $0.50 \times 10^{-3}$ $m^3 \cdot kg^{-1}$, the number of contact points lacks, and, when the particle void volume exceeds $0.90 \times 10^{-3}$ $m^3 \cdot kg^{-1}$, the probability of contact between the magnesium oxide particle aggregates becomes too large, and hence magnesium oxide undergoes a reaction therebetween before forming forsterite and is then inactivated. Thus, in any cases, forsterite is not formed at a satisfactory rate.

Further, the micropore volume is critical. The smaller the particles, the larger the curvature of the particle surface or the higher the surface energy, then it makes the activity higher. Therefore, it is considered that the particle structure having micropores formed therein is a highly reactive particle structure. However, when such a highly active particle structure has a micropore volume of more than $0.11 \times 10^{-3}$ $m^3 \cdot kg^{-1}$, the probability of contact between the highly active particle structures becomes too large, and hence the highly active particle structures undergo a reaction therebetween before contributing to the formation of forsterite, so that forsterite is not formed at a satisfactory rate. On the other hand, when the highly active particle structure has a micropore volume of less than $0.04 \times 10^{-3}$ $m^3 \cdot kg^{-1}$, the lack of the contact points cannot be made up for, so that forsterite cannot be formed at a satisfactory rate.

From the above results, when a requirement that the first inflection point diameter be more than $0.30 \times 10^{-6}$ to $0.60 \times 10^{-6}$ m or the interparticle void volume be $0.80 \times 10^{-3}$ to less than $1.40 \times 10^{-3}$ $m^3 \cdot kg^{-1}$, the particle void volume be $0.50 \times 10^{-3}$ to $0.90 \times 10^{-3}$ $m^3 \cdot kg^{-1}$, and the micropore volume be $0.04 \times 10^{-3}$ to $0.11 \times 10^{-3}$ $m^3 kg^{-1}$ is satisfied, forsterite can be formed from the magnesium oxide particle aggregate and $SiO_2$ stably at a rate of 90% or higher.

Next, a magnesium oxide particle aggregate having a first inflection point diameter, an interparticle void volume, a particle void volume, and a micropore volume each being in the above-mentioned range can be prepared as follows. It is noted that the preparation method described below is merely one example, and a magnesium oxide particle aggregate having the particle aggregation structure defined in the present invention can be prepared by other methods.

The magnesium oxide particle aggregate can be prepared as follows. For example, calcium hydroxide is added to an aqueous solution of magnesium chloride as a raw material to form magnesium hydroxide, and then the magnesium hydroxide is subjected to filtration by means of a filter press, and dehydrated and dried, and then calcined using a rotary kiln, followed by grinding.

The magnesium oxide particle aggregate can be prepared by various methods, for example, a method in which an alkaline aqueous solution, such as an aqueous solution of calcium hydroxide, sodium hydroxide, or potassium hydroxide, is reacted with a magnesium chloride-containing aqueous solution, such as bittern, brackish water, or sea water, to obtain magnesium hydroxide, and the magnesium hydroxide is calcined to obtain a magnesium oxide particle aggregate; a method in which magnesite is calcined to obtain a magnesium oxide particle aggregate; a method (Aman method) in which a magnesium oxide particle aggregate is directly obtained from a magnesium chloride-containing aqueous solution; and a method in which magnesium oxide obtained by the above method is subjected to hydration to form magnesium hydroxide, followed by calcination, to obtain a magnesium oxide particle aggregate.

The first inflection point diameter and particle void volume of the magnesium oxide particle aggregate can be adjusted by controlling the particle structure of magnesium hydroxide which is a precursor of magnesium oxide, the interparticle void volume can be adjusted by controlling the conditions for grinding magnesium oxide obtained by calcination, and the particle structure having micropores formed therein can be obtained by mixing particle aggregates having different calcination degrees prepared by calcining magnesium hydroxide particles having a specific size or larger (BET specific surface area of $15 \times 10^3$ $m^2 \cdot kg^{-1}$ or less).

The first inflection point diameter and particle void volume of the magnesium oxide particle aggregate are adjusted by controlling the particle structure of magnesium hydroxide which is a precursor of magnesium oxide. Namely, a calcium hydroxide slurry is added to a magnesium chloride solution so that the resultant magnesium hydroxide concentration becomes a predetermined value, and the resultant mixture is stirred to effect a reaction at a predetermined temperature for a predetermined time, and then, the reaction mixture is subjected to filtration by means of a filter press, and washed with water and dried to form magnesium hydroxide.

Figure 6:
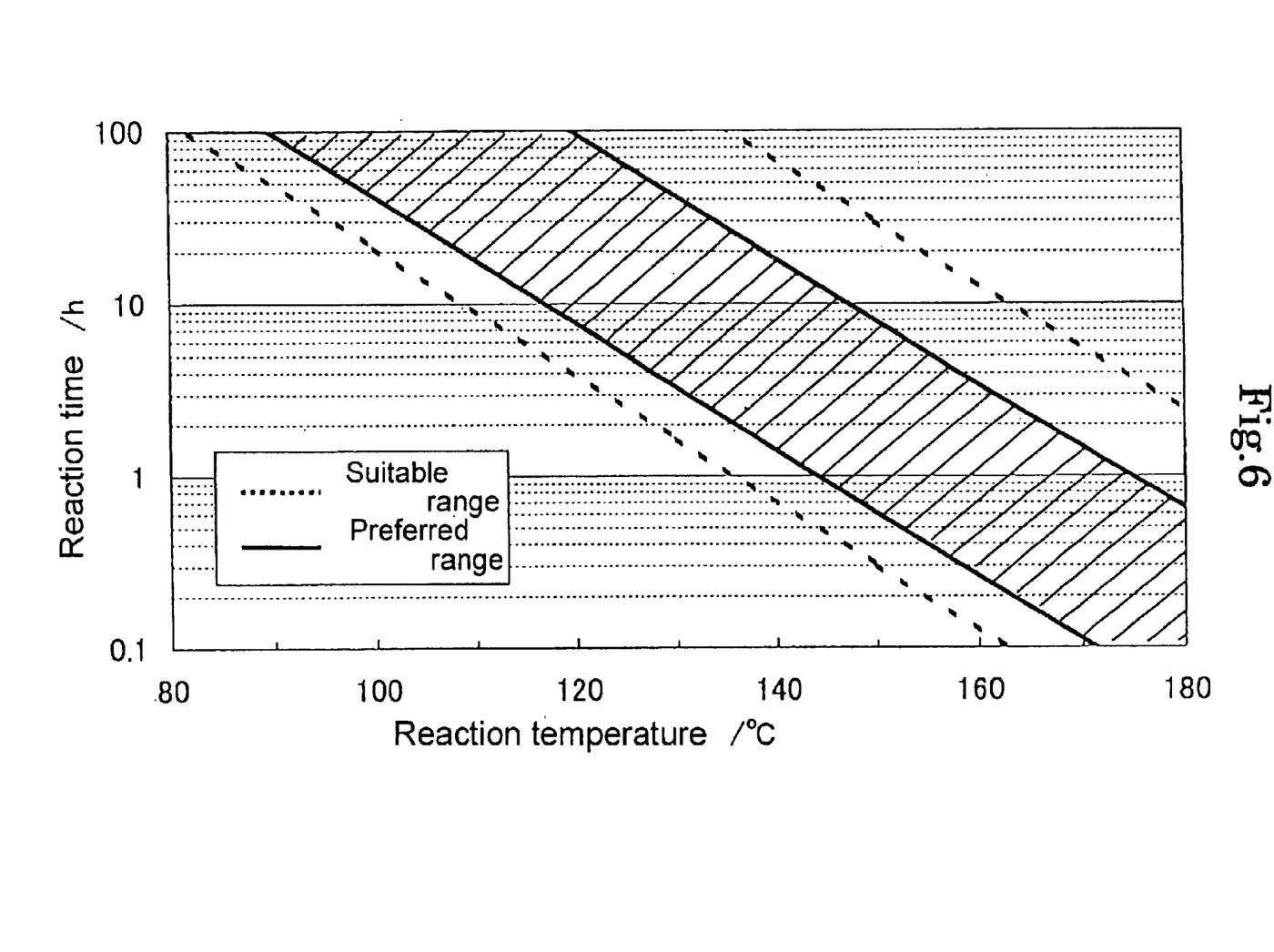
FIG. 6 shows temperature and time conditions suitable for controlling the reaction so that the first inflection point diameter becomes more than $0.30 \times 10^{-6}$ to $0.60 \times 10^{-6}$ m when magnesium hydroxide is prepared by reacting an aqueous solution of magnesium chloride with calcium hydroxide.

For adjusting the first inflection point diameter to be more than $0.30 \times 10^{-6}$ to $0.60 \times 10^{-6}$ m, the reaction temperature and reaction time for the magnesium hydroxide formation are controlled. Namely, as shown in FIG. 6, magnesium hydroxide is formed by a reaction under conditions such that the reaction temperature (T, ° C.) and the reaction time (t, hr) satisfy the relationship represented by the following formula (II).

$$(1.033 \times 10^5) \exp\{(-8.5 \times 10^{-2}) \cdot T\} \leq t \leq (7.861 \times 10^6) \exp\{(-8.32 \times 10^{-2}) \cdot T\} \quad \text{(II)}$$

Further, it is more preferred that the reaction temperature (T, ° C.) and the reaction time (t, hr) satisfy the relationship represented by the following formula (III).

$$(1.943 \times 10^6) \exp\{(-8.45 \times 10^{-2}) \cdot T\} \leq t \leq (2.180 \times 10^6) \exp\{(-8.35 \times 10^{-2}) \cdot T\} \quad \text{(III)}$$

The particle void volume is adjusted by controlling the magnesium hydroxide concentration after the reaction. Namely, the ratio between the magnesium chloride solution and the calcium hydroxide slurry mixed is adjusted so that the magnesium hydroxide concentration after the reaction becomes 0.2 to 4.5 $mol \cdot kg^{-1}$, preferably 0.5 to 3 $mol \cdot kg^{-1}$.

The micropore volume is adjusted by controlling the calcination conditions (temperature×time) for the magnesium hydroxide formed, and magnesium oxide particle aggregates having different calcination degrees are prepared and mixed with each other. In this case, the calcination temperature is 750 to 1,250° C., and the calcination time is 0.2 to 5 hours. In the mixing, with respect to each of the magnesium oxide particle aggregates obtained by calcination under specific calcination conditions, a micropore volume is measured using a mercury porosimetry curve and a mixing ratio is determined by making calculation, and then a mixture having a specific micropore volume is obtained.

For obtaining a particle structure having micropores formed therein, it is required to form by calcination magnesium hydroxide particles having a specific size or larger such that the BET specific surface area is $15 \times 10^3$ $m^2 \cdot kg^{-1}$ or less. The crystal of magnesium hydroxide is of trigonal crystal system, and generally has a hexagonal plate form. In the present invention, the magnesium hydroxide particles may be either single crystalline or polycrystalline, and the form of the particles is not limited to the hexagonal plate form, but the size of the magnesium hydroxide particles indicated by the BET specific surface area is important. The reason for this resides in that, when the BET specific surface area of the magnesium hydroxide particles exceeds $15 \times 10^3$ $m^2 \cdot kg^{-1}$, it is difficult to obtain a particle structure having micropores required. Namely, when magnesium hydroxide changes to magnesium oxide, a volume shrinkage of 50% or more occurs, and therefore, in the smaller magnesium hydroxide particles, the magnesium oxide particles formed moves due to deformation caused by the shrinkage to form relatively large magnesium oxide particles, thus making it difficult to form small magnesium oxide particles needed to form micropores in a specific range.

The interparticle void volume is adjusted by controlling the grinding of the calcined magnesium oxide. For example, when grinding using a hammer mill-type grinder at a power of 5.5 kW having a classifier, the hammer rotational frequency is preferably 2,800 rpm or less.

As a grinder, a hammer mill-type grinder, a high-speed rotating mill-type grinder, a jet mill-type grinder, a roller mill-type grinder, or a ball mill-type grinder can be used. The optimal conditions of the grinder for obtaining the interparticle void volume which falls in the range defined in the present invention vary depending on the system and ability (power) of the grinder used, but too strong grinding increases the interparticle void volume and too weak grinding lowers the interparticle void volume. In the jet mill-type grinder in which the impact energy applied during grinding is large, the impact energy may lower the particle void volume, and therefore the operation of the grinder of this type needs to be controlled under conditions suitable for the apparatus. Further, a classifier is not necessarily used, but the use of a classifier makes it possible to control the grinding conditions more flexibly.

In the reaction of magnesium hydroxide, a flocculant can be added for promoting the aggregation reaction, and a flocculation preventing agent can be added for preventing the aggregation reaction from proceeding to an excess extent. Examples of flocculants include aluminum sulfate, polyaluminum chloride, iron sulfate, and polyacrylamide, and preferred are polyaluminum chloride and anionic polyacrylamide. The flocculant can be added in an amount of 1 to 1,000 ppm, preferably 5 to 500 ppm, more preferably 10 to 100 ppm, based on the total mass of the magnesium chloride solution and the calcium hydroxide slurry. It is not preferred to add a flocculant in an excess amount since a particle aggregate having too high a density such that the particle void volume is less than $0.50 \times 10^{-3}$ $m^3 \cdot kg^{-1}$ is disadvantageously formed.

On the other hand, as a flocculation preventing agent, sodium silicate, sodium polyphosphate, sodium hexametaphosphate, a nonionic surfactant, or an anionic surfactant can be added, and preferred are sodium silicate, sodium hexametaphosphate, and nonionic surfactants. The flocculation preventing agent can be added in an amount of 1 to 1,000 ppm, preferably 5 to 500 ppm, more preferably 10 to 100 ppm, based on the total mass of the magnesium chloride solution and the calcium hydroxide slurry. It is not preferred to add a flocculation preventing agent in an excess amount since a particle aggregate having such a low density that the particle void volume is more than $0.90 \times 10^{-3}$ $m^3 \cdot kg^{-1}$ is disadvantageously formed.

A calcium hydroxide slurry is added to a magnesium chloride solution, and then the stirring was conducted at a stirring rate of 350 to 450 rpm. The stirring does not largely affect the particle structure, but the interparticle void volume can be increased by stirring at a high speed and at a high shear rate by means of, for example, a homogenizer during the reaction or can be lowered by almost no stirring.

Next, using the thus obtained magnesium oxide, an annealing separator for grain-oriented magnetic steel sheet and a grain-oriented magnetic steel sheet are produced as follows.

A grain-oriented magnetic steel sheet is produced as follows: a silicon steel slab having an Si content of 2.5 to 4.5% is hot-rolled and washed with an acid, and then subjected to cold rolling or twice cold rolling including intermediate annealing so that the resultant sheet has a predetermined thickness. Then, the cold-rolled coil is subjected to recrystallization annealing, which also effects decarburization, in a wet hydrogen gas atmosphere at 700 to 900° C. to form an oxide film comprised mainly of silica ($SiO_2$) on the surface of the steel sheet. An aqueous slurry obtained by uniformly dispersing in water the magnesium oxide particle aggregate having the particle aggregation structure of the present invention prepared by the above method is continuously applied onto the resultant steel sheet using a roll coater or a spray, and dried at about 300° C. The thus treated steel sheet coil is subjected to final finishing annealing, for example, at 1,200° C. for 20 hours to form forsterite ($Mg_2SiO_4$) on the surface of the steel sheet, and the forsterite imparts a tension to the surface of the steel sheet along with the insulating film to improve the core loss of grain-oriented magnetic steel sheet.

As described in, for example, Japanese Prov. Patent Publication No. 101059/1994, for facilitating the forsterite film formation, a known reaction accelerator, inhibitor auxiliary, or tension-imparting insulating film additive can be added to the annealing separator.

EXAMPLES

Next, the present invention will be described with reference to the following Examples.

Example 1

A calcium hydroxide slurry was added to a magnesium chloride solution having a concentration of 2.0 $mol \cdot kg^{-1}$ so that the magnesium hydroxide concentration after reaction became 1.2 $mol \cdot kg^{-1}$, and the resultant mixture was subjected to reaction in an autoclave at 150° C. for 3 hours to prepare magnesium hydroxide having a BET specific surface area of $8.2 \times 10^3$ $m^2 \cdot kg^{-1}$. The magnesium hydroxide prepared was calcined using a rotary kiln individually at temperatures of 800° C., 950° C., and 1,050° C. for one hour, and then ground by means of an impact grinder to produce three types of magnesium oxide particle aggregates having different calcination degrees. Then, the three types of magnesium oxide particle aggregates produced were mixed together in a mixing ratio of 30:40:30 to obtain a magnesium oxide particle aggregate having a particle aggregation form which falls in the range defined in the present invention.

Example 2

Magnesite was calcined using a rotary kiln at 1,100° C. for one hour to prepare magnesium oxide having a BET specific surface area of $5.2 \times 10^3$ $m^2 \cdot kg^{-1}$. The magnesium oxide prepared was added to water so that the slurry concentration became 2 $mol \cdot kg^{-1}$ to effect a reaction at 90° C. for 2 hours, preparing magnesium hydroxide having a BET specific surface area of $7.5 \times 10^3$ $m^2 \cdot kg^{-1}$. Then, the magnesium hydroxide prepared was calcined using a rotary kiln at 980° C. individually for 0.2 hour, 0.5 hour, 0.8 hour, and 2 hours, and then ground by means of an impact grinder to produce magnesium oxide particle aggregates having different calcination degrees. Then, the four types of magnesium oxide particle aggregates produced were mixed together in a mixing ratio of 25:30:15:30 to obtain a magnesium oxide particle aggregate in Example 2 having a particle aggregation form which falls in the range defined in the present invention.

Example 3

A slaked lime slurry was added to bittern so that the magnesium hydroxide concentration after reaction became 1.2 mol·kg$^{-1}$, and the resultant mixture was stirred at 600 rpm to effect a reaction at 80° C. for 2 hours. Then, the reaction mixture was subjected to filtration by means of a filter press, and washed with water and dried, and the resultant magnesium hydroxide was calcined using a rotary kiln at 900° C. for one hour to prepare magnesium oxide having a BET specific surface area of 20.6×10$^3$ m$^2$·kg$^{-1}$. The magnesium oxide prepared was added to water so that the slurry concentration became 3 mol·kg$^{-1}$, and then calcium chloride was added thereto in an amount of 2 mol %, based on the mole of the magnesium oxide, and the resultant mixture was subjected to reaction at 80° C. for 2 hours to prepare magnesium hydroxide having a BET specific surface area of 11.0×10$^3$ m$^2$·kg$^{-1}$. Next, the magnesium hydroxide was calcined using a muffle furnace at a furnace temperature of 1,200° C. individually for calcination times of 2 hours, 3 hours, and 4 hours, and then ground by means of an impact grinder to produce magnesium oxide particle aggregates having different calcination degrees. Then, the three types of magnesium oxide particle aggregates produced were mixed together in a mixing ratio of 25:40:35 to obtain a magnesium oxide particle aggregate in Example 3 having a particle aggregation form which falls in the range defined in the present invention.

Comparative Example 1

A slaked lime slurry was added to bittern so that the magnesium hydroxide concentration after reaction became 2 mol·kg$^{-1}$, and the resultant mixture was stirred at 600 rpm to effect a reaction at 80° C. for 2 hours. Then, the reaction mixture was subjected to filtration by means of a filter press, and washed with water and dried, and the resultant magnesium hydroxide was calcined using a rotary kiln at 890° C. for one hour to prepare a magnesium oxide particle aggregate. Then, the particle aggregate prepared was ground by means of an impact grinder to produce a magnesium oxide particle aggregate in Comparative Example 1 having a specific particle aggregation structure in the earlier patent application filed by the present inventors (Japanese Patent Application No. 2000-132370).

Comparative Examples 2 to 4

The magnesium oxide particle aggregates obtained in Example 1 by calcining magnesium hydroxide using a rotary kiln individually at temperatures of 800° C., 950° C., and 1,050° C. for one hour, and then grinding the calcined product by means of an impact grinder were not mixed together but individually used.

Comparative Example 5

Bittern and slaked lime were reacted with each other at 40° C. for 10 hours to form magnesium hydroxide, and then the magnesium hydroxide was calcined by means of a rotary kiln at 1,050° C. The thus produced magnesium oxide particles are not controlled with respect to the particle aggregation structure as conducted in the present invention, and they are magnesium oxide for annealing separator used for general magnetic steel sheets.

Comparative Example 6

Slaked lime was added to sea water so that the magnesium hydroxide concentration after reaction became 0.05 mol·kg$^{-1}$ to effect a reaction at 50° C. for 20 hours, thus forming magnesium hydroxide. 5 Hours before completion of the reaction, anionic polyacrylamide was added in an amount of 200 ppm, and then the reaction mixture after completion of the reaction was subjected to filtration by means of a filter press and dried. Then, the resultant magnesium hydroxide was calcined by means of a rotary kiln at 950° C. to prepare magnesium oxide particles. The thus prepared particles are not controlled with respect to the particle aggregation structure as conducted in the present invention, and they are magnesium oxide used in an application other than annealing separator.

Table 2 shows the measurement values for particle aggregation structures of the particles or particle aggregates in Examples 1 to 3 and Comparative Examples 1 to 6. As can be seen from this table, in each of Examples 1 to 3 in which the particle aggregate was produced while controlling the particle aggregation structure, the requirement of the present invention that the first inflection point diameter be more than 0.30×10$^{-6}$ to 0.60 ×10$^{-6}$ m or the interparticle void volume be 0.80×10$^{-3}$ to less than 1.40×10$^{-3}$ m$^3$·kg$^{-1}$, the particle void volume be 0.50×10$^{-3}$ to 0.90×10$^{-3}$ m$^3$·kg$^{-1}$, and the micropore volume be 0.04×10$^{-3}$ to 0.11×10$^{-3}$ m$^{-3}$·kg$^{-1}$ is satisfied. In Comparative Example 1, the first inflection point diameter is 0.30×10$^{-6}$ m or less, the interparticle void volume is 1.40×10$^{-3}$ to 2.20×10$^{-3}$ m$^3$·kg$^{-1}$ and the particle void volume is 0.55×10 to 0.80×10$^{-3}$ m$^3$·kg$^{-1}$, namely, the particle aggregate structure falls in the range defined in the earlier patent application filed by the present inventors. On the other hand, in each of Comparative Examples 2 to 4, the first inflection point diameter, the interparticle void volume, and the particle void volume fall in the respective ranges defined in the present invention, but the micropore volume in Comparative Example 2 exceeds the upper limit of the range defined in the present invention, and the micropore volume in each of Comparative Examples 3 and 4 is less than the lower limit. Further, in each of Comparative Examples 5 and 6, the particle aggregation structure is not controlled, and hence, the interparticle void volume in Comparative Example 5 and the first inflection point diameter in Comparative Example 6 fall outside of the respective ranges defined in the present invention, and almost no micropores are present in the particles.

TABLE 2

Measurement values for particle aggregation structures

| Unit | First inflection point diameter *10$^{-6}$ m | Interparticle void volume *10$^{-3}$ m$^3$ · kg$^{-1}$ | Particle void volume *10$^{-3}$ m$^3$ · kg$^{-1}$ | Micropore volume *10$^{-3}$ m$^3$ · kg$^{-1}$ |
|---|---|---|---|---|
| Example 1 | 0.38 | 1.26 | 0.74 | 0.09 |
| Example 2 | 0.41 | 1.19 | 0.69 | 0.06 |
| Example 3 | 0.29 | 1.13 | 0.66 | 0.10 |

TABLE 2-continued

Measurement values for particle aggregation structures

| Unit | First inflection point diameter *$10^{-6}$ m | Interparticle void volume *$10^{-3}$ m$^3$ · kg$^{-1}$ | Particle void volume *$10^{-3}$ m$^3$ · kg$^{-1}$ | Micropore volume *$10^{-3}$ m$^3$ · kg$^{-1}$ |
|---|---|---|---|---|
| Comparative Example 1 | 0.28 | 1.45 | 0.69 | 0.01 |
| Comparative Example 2 | 0.32 | 1.18 | 0.75 | 0.25 |
| Comparative Example 3 | 0.35 | 1.25 | 0.77 | 0.02 |
| Comparative Example 4 | 0.55 | 1.38 | 0.72 | 0.01 |
| Comparative Example 5 | 0.35 | 2.63 | 0.84 | 0.00 |
| Comparative Example 6 | 1.17 | 0.52 | 0.62 | 0.00 |

Next, with respect to the above magnesium oxide particle aggregates or powder particles, the behavior of formation of a forsterite film was examined. It is presumed that the formation of forsterite proceeds according to the solid phase reaction: $2MgO + SiO_2 \rightarrow Mg_2SiO_4$ Therefore, the magnesium oxide powder in each of Examples and Comparative Examples and $SiO_2$ were mixed in a molar ratio of 2:1 to form a mixture, and the mixture was shaped under a pressure of 50 MPa to obtain a shaped article having a diameter of $1.5 \times 10^{-3}$ in and a height of $15 \times 10^{-3}$ m, and then the shaped article was calcined in a nitrogen gas atmosphere at $1,2000°$ C. for 4 hours. This calcination temperature corresponds to the temperature of the finishing annealing in which $SiO_2$ is reacted with a slurry containing magnesium oxide on the grain-oriented magnetic steel sheet. With respect to the thus obtained sintered product, an X-ray diffraction analysis was conducted to quantitatively determine a forsterite ($Mg_2SiO_4$) formation rate. The results are shown in Table 3.

TABLE 3

$Mg_2SiO_4$ formation rate

| | $Mg_2SiO_4$ formation rate/mass % |
|---|---|
| Example 1 | 93.8 |
| Example 2 | 91.8 |
| Example 3 | 92.5 |
| Comparative Example 1 | 90.6 |
| Comparative Example 2 | 85.6 |
| Comparative Example 3 | 83.3 |
| Comparative Example 4 | 73.4 |
| Comparative Example 5 | 77.5 |
| Comparative Example 6 | 63.4 |

As can be seen from Table 3, in each of Examples 1 to 3, the forsterite formation rate is higher than 90%. In Comparative Example 1 which falls in the range in the earlier patent application filed by the present inventors, the micropore volume is extremely small, but the forsterite formation rate is higher than 90%. Thus, in this case, even when no micropore is present, forsterite can be formed at a satisfactory rate. However, in each of Comparative Examples 2 to 6, the forsterite formation rate is as unsatisfactory as less than 90%. Of these, the forsterite formation rate of the magnesium oxide in Comparative Example 5 of an annealing separator in general use and that of the magnesium oxide in Comparative Example 6 used in an application other than the annealing separator are very small.

Next, magnesium oxide was applied to an magnetic steel sheet to examine the properties of a forsterite film. Steel to be examined is a steel sheet obtained by subjecting to hot rolling, washing with an acid, and cold rolling by a known method a silicon steel slab for grain-oriented magnetic steel sheet, which slab comprises C: 0.058%; Si: 2.8%; Mn: 0.06%; Al: 0.026%; S: 0.024%; N: 0.0050%, in terms of % by mass; and the balance of unavoidable impurities and Fe, so that the final sheet thickness becomes 0.23 mm, and subjecting the resultant sheet to decarburization annealing in a wet atmosphere comprised of 25% of nitrogen gas and 75% of hydrogen gas.

The magnesium oxide particle aggregates of the present invention and the magnesium oxide particles in Comparative Examples, each in a slurry form, were individually applied to the above steel sheet so that the dried coating weight became $12 \times 10^{-3}$ kg·m$^{-2}$, and dried and then, subjected to final finishing annealing at $1,200°$ C. for 20 hours. The states of the individual forsterite films formed on the steel sheets are shown in Table 4.

TABLE 4

State of forsterite film formed

| | State of glass film formed | Evaluation |
|---|---|---|
| Example 1 | Uniform and thick | ◉ |
| Example 2 | Uniform and thick | ◉ |
| Example 3 | Uniform and thick | ◉ |
| Comparative Example 1 | Uniform and thick | ◉ |
| Comparative Example 2 | Uniform and slightly thin | ○ |
| Comparative Example 3 | Uniform and slightly thin | ○ |
| Comparative Example 4 | Nonuniform and slightly thin | Δ |
| Comparative Example 5 | Nonuniform and slightly thin | Δ |
| Comparative Example 6 | Nonuniform and very thin | X |

As can be seen from Table 4, the forsterite films formed from the particle aggregates in Examples 1 to 3 and Comparative Example 1 are those having a uniform and satisfactory thickness. Especially the forsterite films formed from the particle aggregates in Examples 1 to 3 have been confirmed to have a large thickness and excellent adhesion properties, as compared with the forsterite films formed from the magnesium oxide particles which are currently used as annealing separators for high grade grain-oriented magnetic steel sheets.

INDUSTRIAL APPLICABILITY

As mentioned above, in the present invention, there can be provided magnesium oxide having a particle aggregation structure which can advantageously form forsterite. In addition, the magnesium oxide particle aggregate of the present invention exhibits excellent forsterite formation, as compared with the magnesium oxide currently used as an annealing separator for grain-oriented magnetic steel sheets.

Therefore, the grain-oriented magnetic steel sheet obtainable by a treatment using the magnesium oxide of the present invention has satisfactory magnetic properties as a grain-oriented magnetic steel sheet. Further, the technical concept of the present invention can be applied not only to the annealing separator but also to other solid phase reactions, for example, ceramic synthesis.

What is claimed is:

1. A magnesium oxide particle aggregate, characterized in that a first inflection point diameter is more than $0.30 \times 10^{-6}$ to $0.60 \times 10^{-6}$ m, a particle void volume is $0.50 \times 10^{-3}$ to $0.90 \times 10^{-3}$ m$^3$·kg$^{-1}$, and a micropore volume is $0.04 \times 10^{-3}$ to $0.11 \times 10^{-3}$ m$^3$·kg$^{-1}$ in the cumulative intrusion volume curve of said particle aggregate.

2. A magnesium oxide particle aggregate, characterized in that an interparticle void volume is $0.80 \times 10^{-3}$ to less than $1.40 \times 10^{-3}$ m·kg$^{-1}$, a particle void volume is $0.50 \times 10^{-3}$ to $0.90 \times 10^{-3}$ m$^3$·kg$^{-1}$, and a micropore volume is $0.04 \times 10^{-3}$ to $0.11 \times 10^{-3}$ m$^3$·kg$^{-1}$ in the cumulative intrusion volume curve of said particle aggregate.

* * * * *